United States Patent [19]
Kennedy et al.

[11] Patent Number: 6,084,967
[45] Date of Patent: *Jul. 4, 2000

[54] RADIO TELECOMMUNICATION DEVICE AND METHOD OF AUTHENTICATING A USER WITH A VOICE AUTHENTICATION TOKEN

[75] Inventors: Paul Roy Kennedy; Timothy Gerard Hall, both of Mesa; William Chunhung Yip, Phoenix, all of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/960,475

[22] Filed: Oct. 29, 1997

[51] Int. Cl.⁷ .................................................... H04L 9/32
[52] U.S. Cl. ............................ 380/247; 705/1; 713/188; 455/411
[58] Field of Search ........................... 380/44, 54, 247; 382/115, 116, 181; 713/186; 455/411, 410

[56] References Cited

U.S. PATENT DOCUMENTS

| | | | |
|---|---|---|---|
| 4,944,008 | 7/1990 | Pionsenka et al. | 380/46 |
| 4,993,068 | 2/1991 | Piosenka et al. | 380/23 |
| 5,047,613 | 9/1991 | Swegen et al. | 235/379 |
| 5,202,921 | 4/1993 | Herzberg et al. | 380/23 |
| 5,347,580 | 9/1994 | Molva et al. | 380/25 |
| 5,412,723 | 5/1995 | Canetti et al. | 380/21 |
| 5,457,747 | 10/1995 | Drexler et al. | 380/24 |
| 5,461,675 | 10/1995 | Diehl et al. | 380/23 |
| 5,469,506 | 11/1995 | Berson et al. | 380/23 |
| 5,471,045 | 11/1995 | Geronimi | 235/492 |
| 5,485,519 | 1/1996 | Weiss | 380/23 |
| 5,513,272 | 4/1996 | Bogosian, Jr. | 382/116 |
| 5,517,569 | 5/1996 | Clark | 380/24 |
| 5,563,945 | 10/1996 | Gercekci | 380/4 |
| 5,594,227 | 1/1997 | Deo | 235/380 |
| 5,602,918 | 2/1997 | Chen et al. | 380/21 |
| 5,612,682 | 3/1997 | DeLuca et al. | 340/825 |
| 5,615,260 | 3/1997 | Kurgan | 379/433 |
| 5,623,546 | 4/1997 | Hardy et al. | 380/4 |
| 5,623,637 | 4/1997 | Jones et al. | 395/491 |
| 5,712,912 | 1/1998 | Tomko et al. | 380/23 |
| 5,761,329 | 6/1998 | Chen et al. | 382/116 |

*Primary Examiner*—Gilberto Barron, Jr.
*Assistant Examiner*—Todd Jack
*Attorney, Agent, or Firm*—Gregory J. Gorrie

[57] ABSTRACT

Apparatus and a method are described for providing a security token. The security token may be used for numerous applications, but is particularly useful in conjunction with radiotelephone devices having secure functions. In accordance with the invention the user must insert a PIN and utter sounds. The radiotelephone device will activate the secure functions only if the PIN is correct and the sounds uttered are authenticated against voice feature vectors stores it the token.

15 Claims, 4 Drawing Sheets

RADIO TELECOMMUNICATION DEVICE AND METHOD OF AUTHENTICATING A USER WITH A VOICE AUTHENTICATION TOKEN

FIELD OF THE INVENTION

This invention pertains to communications systems in general and to a communications system in which a security access token is utilized to enable positive user identification.

BACKGROUND OF THE INVENTION

One problem with the use if highly portable communications devices such as personal communication devices and cellular phone type devices is the provision of security measures to prevent fraud and/or theft in the use of the devices and the services that they access. Various measures have been proposed in the past to provide security in numerous applications in which it is necessary or desirable to limit access to a system.

Passwords, for example, hive been widely used to guard authorized access to computers and data. However, password verification schemes are most reliable when the password is manually entered add are not as effective when human interaction cannot be guaranteed.

In other arrangements, electronic keys or tokens are used. Possession of the key or token identifies a user as being a valid user. The lack of possession of such a key or token would indicate that the user is not who he claims to be and he is denied use of the device. However this arrangement is subject to fraud and or unauthorized access occurring if an unauthorized user gains possession of the key or token.

Various arrangements have been proposed or utilized in the past in which a biometric of a person is used to verify or authenticate identification of a system user. "Biometric" as defined, for example, in U.S. Pat. No. 5,469,506 is defined as meaning a substantially stable physical characteristic of a person which can be automatically measured and characterized for comparison. In addition, biometrics, may also include behavioral characteristics, such as the manner in which an individual writes his or her signature.

Increasingly, so called "smart cards" are used for a variety of purposes. A "smart card" is a credit card sized card that has a built-in microcontroller which enables the card to provide, modify or even create data in response to external stimuli. In many instances, the microcontroller is a single water integrated circuit which is mounted on an otherwise plastic credit card. Various smart card protection schemes have been devised to protect the unauthorized access to the data contents on such smart cards. However, conventional password schemes are not effective when used with smart cards because smart cards readers are easy and inexpensive to emulate and such readers may be programmed to check all possible password codes in a relatively short-lived period. Unauthorized persons may thus be able to steal a smart card and identify its password so that the card may be utilized.

BRIEF DESCRIPTION OF THE DRAWINGS

The invention is pointed-out with particularity in the appended claims. However, a more complete understanding of the present invention may be derived by referring to the detailed description and claims when considered in connection within the figures, wherein like reference numbers refer to similar items throughout the figures, and:

The exemplification set oft herein illustrates a preferred embodiment of the insertion in one form thereof, and such exemplification is not intended to be construed as limiting in any manner.

DETAILED DESCRIPTION OF THE DRAWINGS

Figure 1:
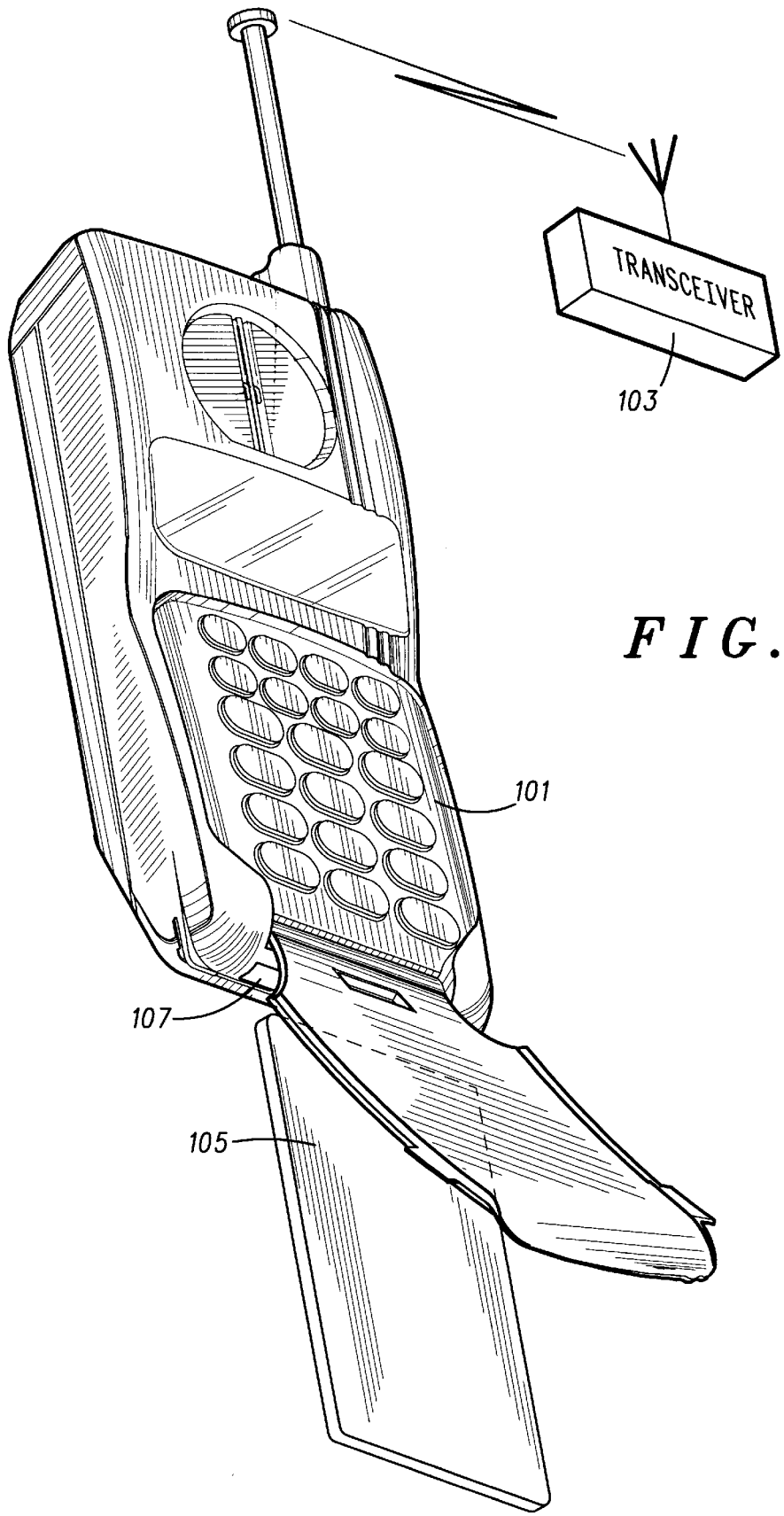
FIG. 1 is a perspective view of a cellular telephone in accordance with the invention.

FIG. 1 illustrates a communication device or radiotelephone to which the principles of the invention may be advantageously applied. The radiotelephone 101 is a personal communication device or cellular telephone of a type which is particularly adapted to be used in a telecommunication system wherein communication is via a second transceiver 103 which is a fixed site transceiver in the case of ground based cellular telephone systems or which may be a satellite based transceiver in the case of a personal communication system utilizing satellites. The radiotelephone 101 includes an opening 107 which is adapted to receive a token or smart card 105. The smart card 105 can be a full size smart card or a chip size smart card. U.S. Pat. No. 5,615,260 describes the construction of a radiotelephone such as that shown in FIG. 1 in greater detail and the details of that patent are incorporated herein by reference. The smart card 105 is read by a card reader disposed within the radiotelephone 105. Card readers for smart cards are known and the particular details thereof are of no significance to the present invention. The smart card 105 is utilized as a security token or key in accordance with the principles of the invention. A smart card 105 suitable for use with the invention is described in U.S. Pat. No. 5,563,945 which is assigned to the same assignee as the present invention. The disclosure set forth in that patent is incorporated herein by reference. Those skilled in the art will appreciate that the term "smart card" as used herein is intended to refer to a variety of media, including integrated circuit "chip cards" and PCMCIA cards.

In one embodiment of the present invention, the token may be comprised entirely of software. In this embodiment, a hardware smart card is not required. In this embodiment, the software token securely contains the information that would be embodied in a hardware smart card token.

To provide for an authentication function in accordance with the invention, the smart card 105 stores "feature vectors" of a users voice. The feature vectors are encrypted and stored in the smart card 105. When the smart card 105 is inserted into the radiotelephone 105 the user is prompted to state a particular sound pattern such as the user's name. The radiotelephone 101 circuitry will compare the spoken sound or utterance with the feature vector and if the comparison is successful, access to the functions of the radiotelephone will be provided.

Figure 2:
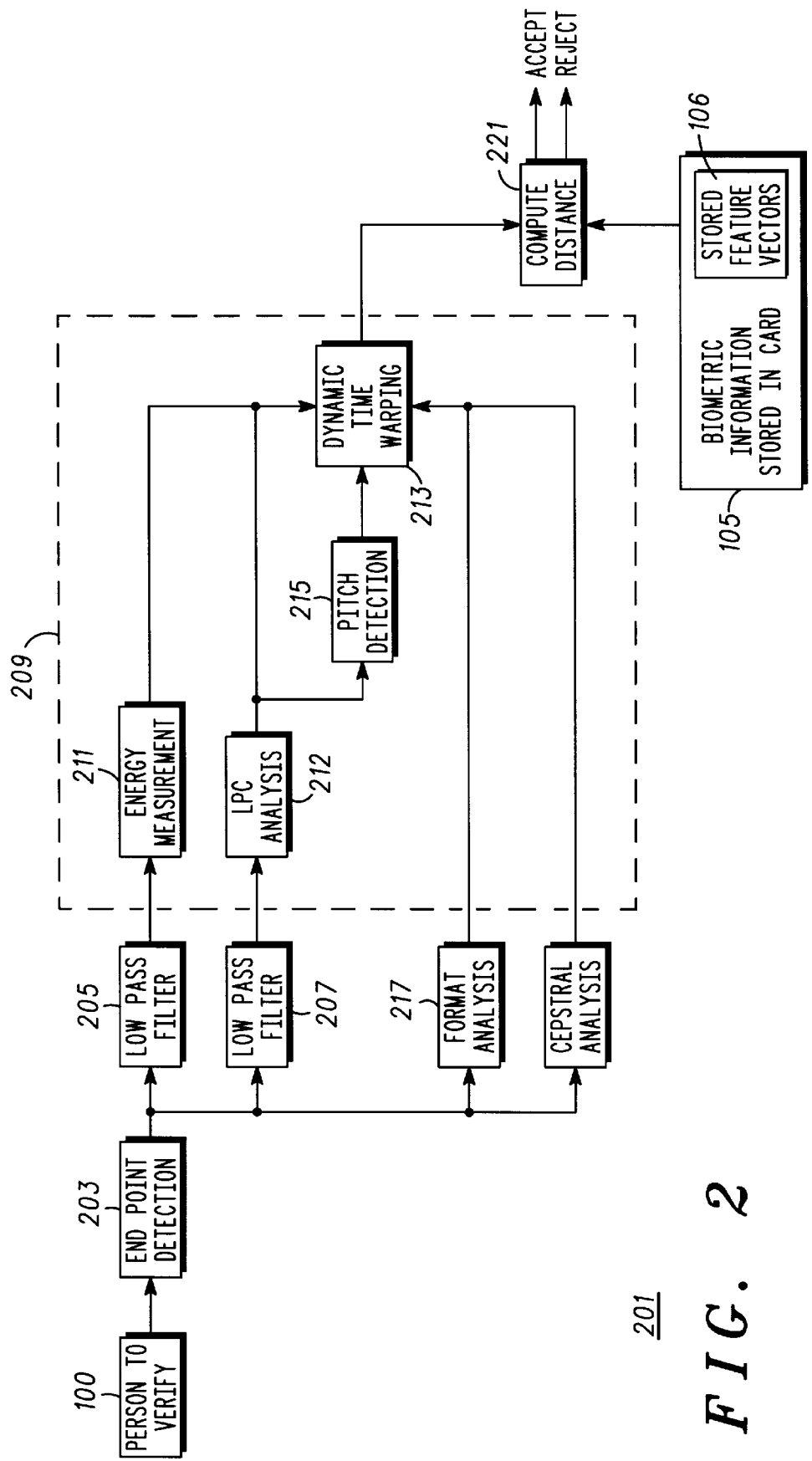
FIG. 2 is a block diagram of a voice verification system in accordance with the invention.

Turning now to FIG. 2 a biometric verification system in accordance with a voice biometric embodiment of the present invention is shown. Other embodiments of the present invention include biometrics other than voice. Such other biometrics suitable for use in the present invention include rental scan data, fingerprint, voice a print, hand writing, video imaging, pattern recognition and DNA. Generally speaking, any information that is unique to an individual is suitable.

The radiotelephone 101 includes biometric verification circuitry 201 which works in cooperation with the token or smart card 105. Smart card 105 includes memory 106 into which is stored feature vectors for the users speech. Reader circuitry extracts the feature vectors from the card memory 106. After a user has inserted the card 105 into the radiotelephone 101. The user 100 will be prompted to speak predetermined sounds, such as to state his/her name. The speech is converted into digital speech signals by conventional circuitry in the radiotelephone 101. The digital speech signals are applied to an end point detector 203 which detects the beginning and end of a word. The endpoint detector 203 is used to locate the sample utterance. Once the beginning and end of an utterance have been found, a series of measurements and parameter estimates are made to extract the specific patterns which represent the utterance.

The digital speech signals are applied to low pass filters 205 and 207 which form part of the signal conditioning process. Each of the low pass filters 205, 207 blocks any high frequency components in the speech and only allows the low frequency components to pass. The filtered signals are passed on to the feature extraction function 209. The dimensionally of speech patterns will often be intolerably large. Therefore, specific values which are unique to a particular speech pattern are extracted by forming functional over-selected subsets of pattern elements. The various extraction mechanisms are described below.

The filtered voice signals from the low pass filter 205 are applied to energy management circuitry 211. The output of circuitry 211 may be viewed as an averaged normalized gain of a segment of speech. The amplitude of speech signals vary appreciably with time. In particular, the amplitude of unvoiced segments are generally much lower than the amplitude of voiced segments. A Hamming or rectangular window is used to identify the targeted segment of the utterance. The window need not be restricted to rectangular or Hamming form or to any function commonly used as a window in a spectrum analysis or digital filter design. It is only necessary that the effective filter provide adequate smoothing to provide signals of normalized gain.

The output of low pass filter 207 is subjected to a linear predictive analysis function 212. The basis for the linear predictive analysis function is that a speech sample can be approximated as a linear combination of past speech samples. By minimizing the sum of the squared differences over a finite interval between actual received speech samples and linearly predicted ones, a unique set of predictor coefficients is determined. The predictor coefficients are weighting coefficients used in a linear combination. Speech can be modeled as the output of a linear, time-varying system excited by either quasiperiodic pulses (during voice speech), or random noise (during unvoiced speech). The linear prediction method provides a robust, reliable and accurate method for estimating parameters that characterize the linear time-varying system. The linear predictive analysis may utilize any one of several known formulations including: covariance method, autocorrelation formulation, lattice method, inverse filter formulation, spectral estimation formulation, maximum likelihood formulation, or inner product formulation. The parameters or linear predictive coding (LPC) coefficients are used in conjunction with other features to determine the probability of a match with stored speech vectors. The output of the LPC analysis function 212 provides LPC coefficients to a dynamic time warping function 213. In addition, the LPC residual output from the LPC analysis function 212 is provided to a pitch detection function 215. The pitch detection function 215 provides pitch period estimation which is equivalent to fundamental frequency estimation and is an important feature in speech verification systems. The pitch method may be determined by any one of several methods, including: average zero-crossing rate, average magnitude difference function (AMDF), autocorrelation function, and cepstral analysis.

As shown in FIG. 2, a formant analysis function 217 and cepstral analysis function 219 also provide input to the dynamic time warping function 213.

The formant frequencies of voice depend upon the shape and dimensions of the vocal tract, each shape characterized by a set of formant frequencies. Different sounds are formed by varying the shape of the vocal track. Thus, the spectral properties of the speech signal vary with time as the vocal tract shape varies. Formants are estimated from the predictor parameters by the formant analysis function 217 in one of two ways. The most direct way is to factor the predictor polynomial and based upon the roots obtained, decide which are formants and which correspond to spectral shaping poles. An alternative way of estimating formants is to obtain the spectrum and choose formants by a peak picking method.

The cepstrum analysis function 219 is used to provide a way of distinguishing between voiced and unvoiced speech. The pitch period of voiced speech is placed clearly in evidence in the cepstrum. Also formant frequencies show up clearly in the log magnitude of the vocal tract transfer function which is obtained by applying the window to the cepstrum. There is a peak in the cepstrum at the fundamental period of input speech segments. No such peak appears in the cepstrum for unvoiced speech segments. These properties of the cepstrum can be used as a basis for determining whether a speech segment is voiced or unvoiced and for estimating the fundamental period of voiced speech. The outline of the speech estimation procedure based on the cepstrum is simple. The cepstrum is searched for a peak in the vicinity of the expected pitch period. If the cepstrum peak is above a preset threshold, the input speech segment is likely to be voiced, and the position of the peak is a good estimate of the pitch period. If the peak does not exceed the threshold, it is likely that the input speech segment is unvoiced. The time variation of the mode of excitation and the pitch period can be estimated by computing a time-dependent cepstrum based upon a time-dependent Fourier transform. Typically the cepstrum is computed once every 10–20 msec. since the excitation parameters change rapidly in normal speech.

The outputs of the energy measurement function 211, the LPC coefficients from the LPC analysis function 212, the pitch lag and pitch gain from the pitch detection function 215 formant locations from the formant analysis function 217 and flow time energy from the cepstral analysis function 219 are all provided to the dynamic time warping function 213. The dynamic time warping function is used to curve fit the stored feature vectors with the to be verified feature vectors such as LPC coefficients or cepstral estimates. A Hidden Markav Model (HMM) can also be used to curve fit and match with stored feature vectors. The output of the dynamic time warping function 213 is provided to a compute distance function 221. The compute distance function is used to compare different speech parameters with the stored feature vectors from the card 105.

Several methods may be used to compare different speech parameters, such as energy, LPC coefficients, pitch period and gain, formant locations, and cepstral high time and low time estimates. The methods utilized may be any one of several, including contour distance measure, which is an average summation of differences of each of the parameters; a least mean square (LMS) error; weighted Gaussium density distribution matching; and any other weighted or non-weighted statistical measurement.

Figure 3:
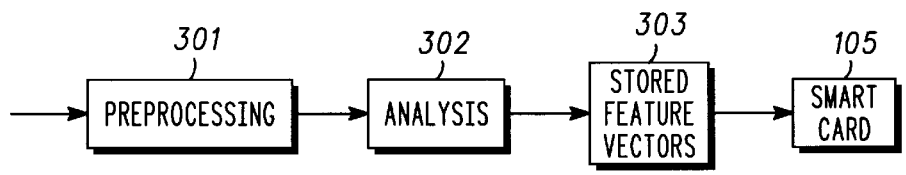
FIG. 3 is a functional block diagram for preparing a card in accordance with the invention.

Turning now to FIG. 3, a functional diagram is shown to indicate preparing a smart card 105 to be utilized in accordance with the system of the invention. To prepare the smart card 105, for a card user or "enrollee," the enrollees identity must be stored in memory on card 105. The enrollee is identified and asked to voice a certain speech pattern. Digitized signals from that speech pattern are subject to pre-processing 301 which provides pattern vectors. The pattern vectors are subjected to analysis 302 to produce feature vectors as described in FIG. 2. The feature vectors in turn are stored 303 in memory 106 on card 105.

Figure 4:
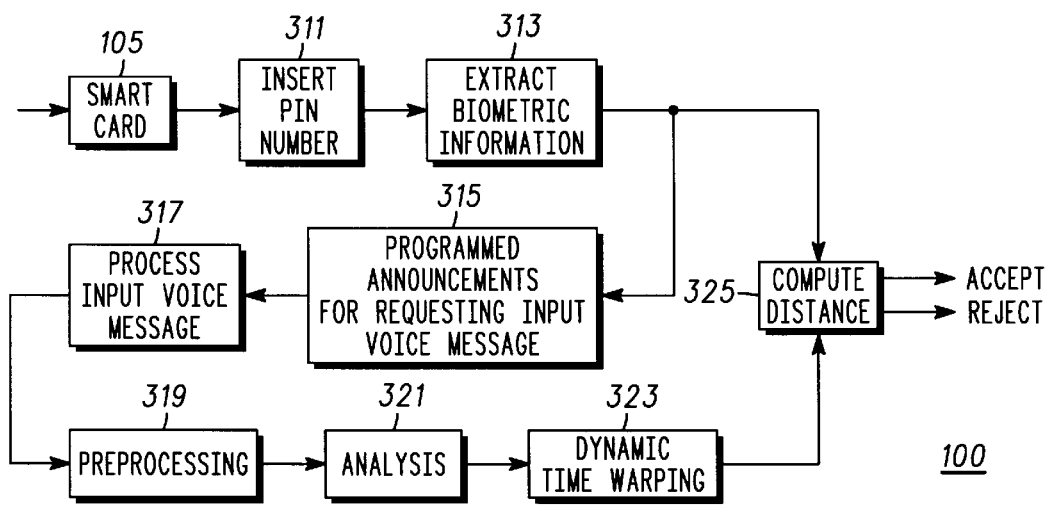
FIG. 4 is a functional black diagram of the authentication of a system user.

In FIG. 4, operation of the system of the invention is shown in graphical form. A person wishing to utilize the radio telephone 101 of FIG. 1 must first insert the authentication token carrying card 105 into the card slot 107. The user must then key in his personal identification number (PIN) 311. After the personal identification number 311 is entered, feature vectors are extracted 313 from memory on card 105 to be used to compute distances during comparison with the user.

A program announcement 315 prompts the user to utter a series of words which are digitized by voice processing function 317 and subjected to preprocessing function 319. The pre-processing/signal conditioning function 319 in general includes linear conversions, low pass filter (LPF), band pass filter (BPF), sample rate conversion, spectral tilt, down sample, up sample, and gain control. These functions are classified as "signal conditioning" before the identified pattern is ready for feature extraction.

Analysis function 321 extracts specific features from the pattern vectors. There are various known methods to accomplish this. For voice identification, LPC coefficients may be extracted for comparison.

Dynamic time warping 323 is used to curve fit stored feature vectors with the to be verified feature vectors of the users utterance and the distances are computed at step 325, resulting in either authentication which would provide an accept signal, or a lack of authentication which would provide a reject signal.

Figure 5:
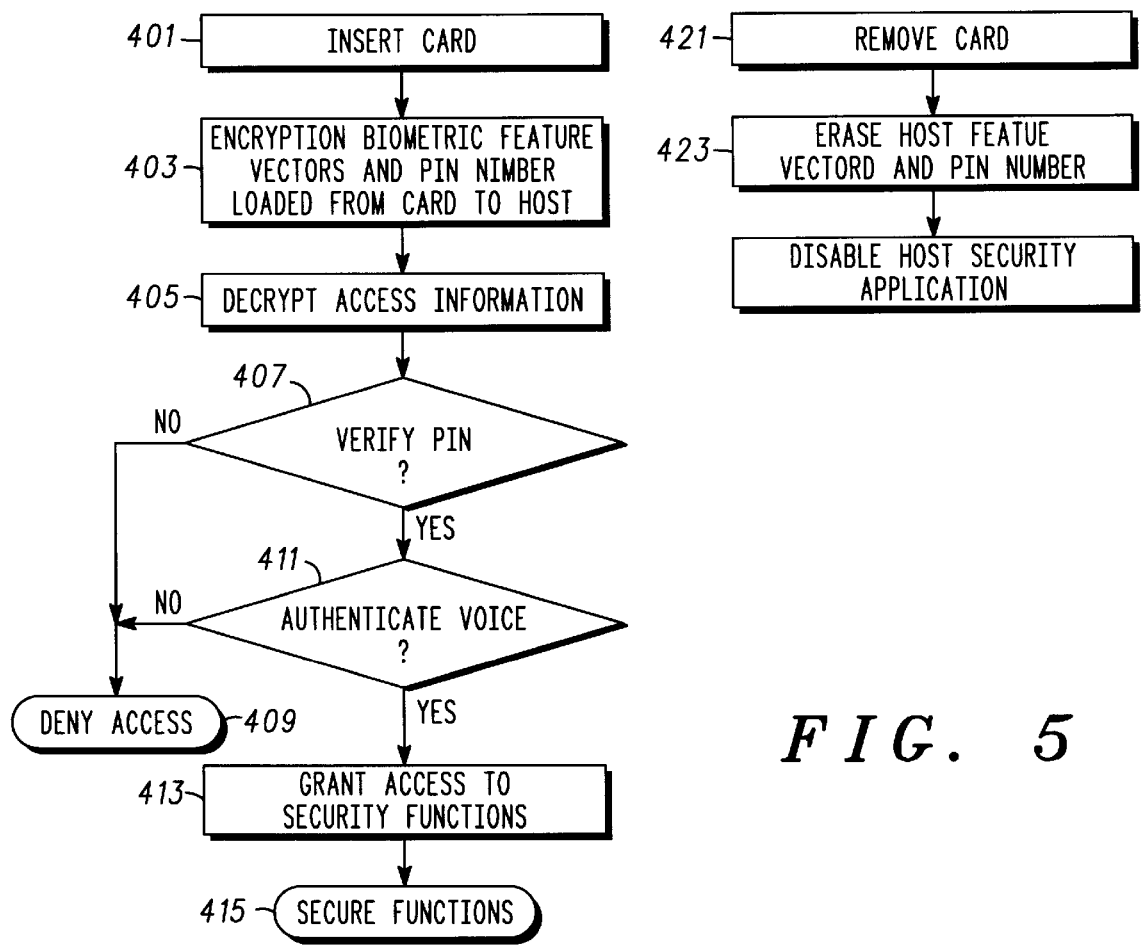
FIG. 5 is an operational flow diagram of an authentication function in accordance with the Invention.

Turning now to FIG. 5, an overview of the operational flow of a radio telephone 101 utilizing the invention as shown. Initially, the card 105 is inserted at step 401. The encrypted biometric feature vectors and personal identification number stored on the card 105 are loaded from the card to the host or in this instance, to radio telephone 101 in step 403. A decryption operation occurs in which access information, i.e., the biometric feature vectors and personal identification number are decrypted at step 405. A personal identification number (PIN) inserted by the user is compared against the personal identification number decrypted from the card 105 at step 407. If the personal identification number does not match, access to use the radiotelephone 101 is denied at step 409. If, however, the personal identification number matches, biometric verification is performed to compare feature vectors against spoken words to authenticate the voice at step 411. If the voice cannot be authenticated, the system will again deny access 409. If the voice is authenticated, various limited access secure functions of the radiotelephone 101 may be accessed 413 and those secure functions 415 may be entered. The operation may be reversed by removing the card 105 at step 421. At that time, the host or radio telephone 101 erases the feature vectors and personal identification number at step 423. The host security application is then disabled 425 until such time as it is re-enabled by repeating the process set forth in steps 401 through 415.

Figure 6:
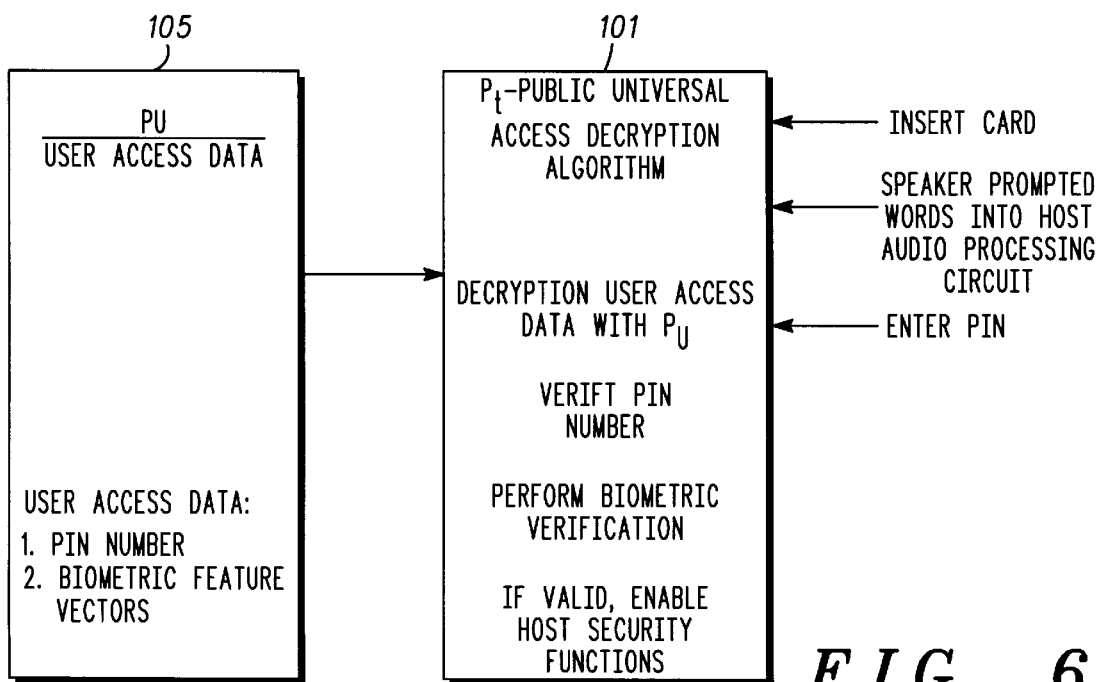
FIG. 6 illustrates the functions performed by a card and a host in accordance with the invention.
Figure 7:
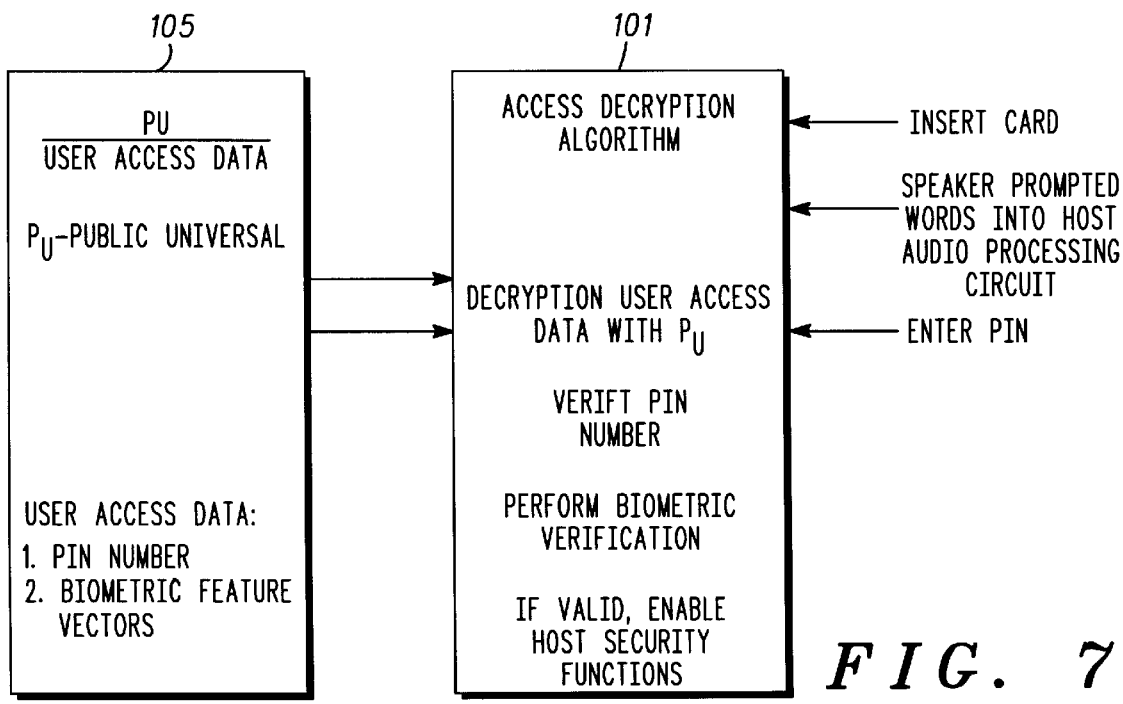
FIG. 7 illustrates the functions performed by a card and a host in accordance with the invention.

Turning now to FIGS. 6 and 7, two different scenarios for access control to the radio telephone device 101 as shown. In both these drawings, the card 105 functionality is shown and the host or radio telephone device 101 functionality is likewise shown. In the scenario shown in FIG. 6, a trusted third party creates credentials for the user and then encrypts the voice data with a private universal code (PUC) known only to the trusted third party. The card is inserted into the radio telephone device 101 which is identified as the host. The encrypted biometric feature vectors, i.e., voice information, and the personal identification number jointly referred to as "access data" is transferred from the card 105 to the host 101. The access data is encrypted in a private key known only to the trusted third party as noted above. The host 101 decrypts the access data utilizing a public key that was previously loaded into the host 101. The user must enter his personal identification number (PIN) and, if the personal identification number (PIN) is accepted, must perform voice authentication. If the personal identification number is rejected, the security options are disabled. Upon accepting the personal identification number, the user is prompted for spoken words, after which the host 101 performs speech verification in accordance with various algorithms described above. The biometric feature vectors are compared against the user's spoken words and a decision is made by the host 101 to accept or reject. If accepted, the security operations are enabled. If rejected, all security operations are disabled.

Turning now to FIG. 7, a second scenario is shown. In the second scenario, the description is the same except that the card 105 also holds a public key which is transferred along with the encrypted access data. All other functions in scenario two are the same as for scenario one.

The invention has been described in conjunction with the illustrative embodiment of the invention.

As will be apparent to those skilled in the art, various changes and modifications may be made to the above-described embodiment without departing from the spirit or scope of the invention. It is intended that the invention be limited not by the illustrative embodiment, but be limited only by the scope of the claims appended hereto.

What is claimed is:

1. A radio frequency (RF) portable telecommunication device, comprising:
    a token receiving portion adapted to receive and read an encrypted personal identification number and encrypted first voice feature vectors of spoken words stored in a voice authentication token when said voice authentication token is inserted into the token receiving portion;
    a keypad for permitting a user to enter an identification number;
    apparatus for decrypting the encrypted personal identification number;
    a first comparator for comparing said decrypted personal identification number with said entered personal identification number;
    voice receiving circuitry for receiving predetermined sounds comprised of speech segments from said user and for extracting second voice feature vectors from said speech segments; and apparatus for decrypting said encrypted first voice feature vectors;

a second comparator for comparing said second voice feature vectors with said decrypted first voice feature vectors, wherein predetermined secure functions of said telecommunication device are enabled when said first and said second comparators both indicate that a match has occurred, said secure features being enabled only while said authentication token is present in said token receiving portion, wherein the voice receiving circuitry comprises:
 a converter for converting the predetermined sounds to digital speech signals;
 an end point detector for detecting a beginning and an end of each of the speech segments;
 a first and second low-pass filter for filtering each detected speech segment of the digital speech signals to produce digitally filtered voice signals;
 energy management circuitry for producing an energy estimate for each detected speech segment based on an averaged normalized gain for each detected speech segment;
 a linear predictive analyzer for performing a linear predictive analysis on the digitally filtered voice signals produced by the second low-pass filter to determine a set of linear predictive coefficients for each detected speech segment;
 a pitch detector for performing a pitch detection on the linear predictive coefficients to produce a pitch lag and pitch gain for each detected speech segment;
 a formant analyzer for performing a formant analysis on the digitally filtered voice signals to determine formant frequency locations for each speech segment;
 a cepstral analyzer for performing a cepstral analysis on the digitally filtered voice signals to produce cepstral high-time and low-time estimates for each speech segment; and
 a dynamic time-warping element for forming the second voice feature vectors by performing a dynamic time-warping function on said energy estimate, the set of linear predictive coefficients, the pitch lag and gain, the formant frequency locations and the cepstral high-time and low-time estimates.

2. A telecommunication device as claimed in claim 1 wherein said predetermined secure functions of said telecommunication device are disabled when the voice authentication token is removed from the telecommunication device.

3. A telecommunication device in accordance with claim 1, wherein said voice authentication token is comprised entirely of software.

4. A telecommunication device in accordance with claim 1, wherein said voice authentication token is comprises a smart card.

5. A telecommunication device in accordance with claim 2, wherein:
 the voice receiving circuitry prompts the user to speak the predetermined sounds when the said decrypted personal identification number and said entered personal identification number match.

6. A telecommunication device in accordance with claim 1, wherein the first voice feature vectors and the personal identification number are encrypted with a private key to known to the user and stored on the voice authentication token, and wherein:
 said voice authentication token further comprises a decryption key stored therein; and
 said decrypting apparatus utilizes said decryption key to decrypt said first voice feature vectors.

7. A method of authenticating a user of a portable RF telecommunications device, wherein first voice feature vectors of spoken sounds of the user and a personal identification number are stored in an encrypted form on a voice authentication token, the method comprising the steps of:
 receiving said voice authentication token placed in said telecommunications device;
 receiving an entered personal identification from a proposed user;
 decrypting the encrypted personal identification number stored on the voice authentication token;
 comparing the entered personal identification number with the decrypted personal identification number;
 reading said first voice feature vectors from said voice authentication token;
 prompting said proposed user to speak predetermined sounds comprised of speech segments;
 forming second voice feature vectors from said speech segments;
 comparing said first and second voice feature vectors;
 enabling secure features of said telecommunications device when said first and second voice feature vectors match,
wherein the reading, prompting, forming and comparing the first and second voice feature vector steps are performed when the entered personal identification number matches the decrypted personal identification number, and wherein the forming second voice feature vectors step comprises the steps of:
 converting the predetermined sounds to digital speech signals;
 applying the digital speech signals to an end point detector to detect a beginning and an end of each of the speech segments;
 filtering each detected speech segment of the digital speech signals with a first and second low-pass filter to produce digitally filtered voice signals;
 applying the digitally filtered voice signals produced by the first low-pass filter to energy management circuitry, the energy management circuitry producing an energy estimate for each detected speech segment based on an averaged normalized gain for each detected speech segment;
 performing a linear predictive analysis on the digitally filtered voice signals produced by the second low-pass filter to determine a set of linear predictive coefficients for each detected speech segment;
 performing a pitch detection on the linear predictive coefficients to produce a pitch lag and pitch gain for each detected speech segment;
 performing a formant analysis on the digitally filtered voice signals to determine formant frequency locations for each speech segment;
 performing a cepstral analysis on the digitally filtered voice signals to produce cepstral high-time and low-time estimates for each speech segment; and
 forming the second voice feature vectors by performing a dynamic time-warping function on said energy estimate, the set of linear predictive coefficients, the pitch lag and gain, the formant frequency locations and the cepstral high-time and low-time estimates.

8. A method in accordance with claim 7 further comprising the steps of:

disabling said secure features of the telecommunication device when said voice authentication token is removed.

9. A method in accordance with claim 8 wherein the first voice feature vectors and personal identification number are encrypted with a private key not known to the user, and wherein a decryption key is stored on the voice authentication token, the decryption key being a public key and the method further comprises the steps of:

said telecommunications device reading said decryption key from said voice authentication token; and said telecommunications device utilizing said decryption key to decrypt said first voice feature vectors read from said voice authentication token.

10. A method in accordance with claim 8 further comprising the steps of:

forming said first voice feature vectors;

encrypting the first voice feature vectors with said private key; and storing the first voice feature vectors in encrypted form on the voice authentication token, wherein the forming the first voice feature vectors step comprises the steps of:

prompting a card user to speak the predetermined sounds;

converting the predetermined sounds to digital speech signals;

applying the digital speech signals to an end point detector to detect a beginning and an end of each of the speech segments;

filtering each detected speech segment of the digital speech signals to produce digitally filtered voice signals;

applying the digitally filtered voice signals produced to energy management circuitry, the energy management circuitry producing an energy estimate for each detected speech segment based on an averaged normalized gain for each detected speech segment;

performing said linear predictive analysis on the digitally filtered voice signals to determine a set of linear predictive coefficients for each detected speech segment;

performing said pitch detection on the linear predictive coefficients to produce a pitch lag and pitch gain for each detected speech segment;

performing said formant analysis on the digitally filtered voice signals to determine formant frequency locations for each speech segment;

performing said cepstral analysis on the digitally filtered voice signals to produce cepstral high-time and low-time estimates for each speech segment; and forming the first voice feature vectors by performing said dynamic time-warping function on said energy estimate, the set of linear predictive coefficients, the pitch lag and gain, the formant frequency locations and the cepstral high-time and low-time estimates.

11. A method in accordance with claim 7, wherein said voice authentication token comprises a smart card.

12. A method in accordance with claim 7, wherein said voice authentication token is comprised entirely of software.

13. A radio telephone which uses biometrics to authenticate users comprising:

a token receiving portion adapted to receive encrypted first voice feature vectors of spoken words stored in a voice authentication token and a key stored in the voice authentication token when said voice authentication token is inserted into the token receiving portion;

voice receiving circuitry for receiving predetermined sounds comprised of speech segments from said user and for extracting second voice feature vectors from said speech segments by performing energy estimates, using linear predictive coefficients, and performing a cepstrum analysis on the speech segments;

apparatus for decrypting said encrypted first voice feature vectors using the key;

a comparator for comparing said second voice feature vectors with said decrypted first voice feature vectors;

means for enabling said radio telephone when said comparator indicates that a match has occurred, said radio telephone being enabled only while said authentication token is present in said token receiving portion; and means for disabling said radio telephone when the voice authentication token is removed from the radio telephone.

14. The radio telephone as claimed in claim 13 further comprising an RF transceiver for communicating RF signals with a remote transceiver that is part of a communication system.

15. The radio telephone as claimed in claim 14 wherein the remote transceiver is located on a satellite.

* * * * *